US009866919B2

United States Patent
Godor et al.

(10) Patent No.: US 9,866,919 B2
(45) Date of Patent: Jan. 9, 2018

(54) METHOD OF TRANSMITTING MBMS DATA IN AN E-UTRAN-SYSTEM

(75) Inventors: Istvan Godor, Budapest (HU); Akos Kovacs, Budapest (HU); Andras Racz, Budapest (HU)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 1073 days.

(21) Appl. No.: 12/739,440

(22) PCT Filed: Dec. 18, 2007

(86) PCT No.: PCT/SE2007/051030
§ 371 (c)(1),
(2), (4) Date: Apr. 23, 2010

(87) PCT Pub. No.: WO2009/054766
PCT Pub. Date: Apr. 30, 2009

(65) Prior Publication Data
US 2010/0232340 A1  Sep. 16, 2010

Related U.S. Application Data

(60) Provisional application No. 60/982,460, filed on Oct. 25, 2007.

(51) Int. Cl.
*H04H 20/71* (2008.01)
*H04N 21/63* (2011.01)
(Continued)

(52) U.S. Cl.
CPC .......... *H04N 21/631* (2013.01); *H04H 20/57* (2013.01); *H04L 12/189* (2013.01);
(Continued)

(58) Field of Classification Search
CPC ..... H04L 12/18; H04L 1/0026; H04L 1/0093; H04L 65/4076; H04L 67/322;
(Continued)

(56) References Cited

U.S. PATENT DOCUMENTS 7,660,275 B2    2/2010 Vijayan et al.
2004/0014482 A1  1/2004 Kwak et al.
(Continued)

FOREIGN PATENT DOCUMENTS

JP    2005524333 A    8/2005
JP    2007508783 A    4/2007
(Continued)

OTHER PUBLICATIONS

Pang, A.-C. et al. "Layer-Encoded MBMS Channel Allocation for Mobile Networks." 32nd IEEE Conference on Local Computer Networks, Oct. 15-18, 2007, pp. 244-245.
(Continued)

*Primary Examiner* — Kwang B Yao
*Assistant Examiner* — Syed M Bokhari
(74) *Attorney, Agent, or Firm* — Coats & Bennett, PLLC (57) ABSTRACT

In an Evolved Universal Terrestrial Radio Access Network (E-UTRAN) system Multimedia Broadcast Multicast Service (MBMS) data is transmitted as layered data together with control information comprising information enabling a User Equipment to reconstruct the layered MBMS data.

45 Claims, 6 Drawing Sheets

(51) Int. Cl.

| | |
|---|---|
| *H04H 20/57* | (2008.01) |
| *H04L 12/18* | (2006.01) |
| *H04N 21/2343* | (2011.01) |
| *H04N 21/2381* | (2011.01) |
| *H04N 21/61* | (2011.01) |
| *H04L 29/08* | (2006.01) |
| *H04H 20/67* | (2008.01) |
| *H04W 72/00* | (2009.01) |

(52) U.S. Cl.
CPC ....... *H04L 67/322* (2013.01); *H04N 21/2381* (2013.01); *H04N 21/234327* (2013.01); *H04N 21/6131* (2013.01); *H04H 20/67* (2013.01); *H04W 72/005* (2013.01)

(58) Field of Classification Search
CPC ....... H04L 12/189; H04B 7/155; H04B 7/024; H04M 2203/205; H04N 21/234327; H04N 21/631; H04N 19/00442; H04N 21/6131; H04N 21/2381; H04H 20/57; H04H 20/67; H04W 72/005
USPC .... 370/389, 312, 395.4, 328, 464, 432, 343; 455/63.1; 375/340
See application file for complete search history.

(56) References Cited

U.S. PATENT DOCUMENTS

| | | |
|---|---|---|
| 2004/0117860 A1 | 6/2004 | Yi et al. |
| 2004/0198371 A1 | 10/2004 | Balasubramanian et al. |
| 2005/0129018 A1 | 6/2005 | Casaccia et al. |
| 2005/0129058 A1* | 6/2005 | Casaccia et al. ............. 370/464 |
| 2006/0029066 A1* | 2/2006 | Jeong ..................... H04L 12/56 370/389 |
| 2007/0047552 A1* | 3/2007 | Astely ......................... 370/395.4 |
| 2007/0053336 A1* | 3/2007 | Petrovic et al. ............. 370/343 |
| 2008/0089354 A1* | 4/2008 | Yoon et al. .................... 370/432 |
| 2008/0170541 A1* | 7/2008 | Vartiainen et al. ........... 370/328 |
| 2008/0261531 A1* | 10/2008 | Huang et al. ................ 455/63.1 |
| 2008/0267109 A1* | 10/2008 | Wang et al. .................. 370/312 |
| 2010/0046675 A1* | 2/2010 | Collins et al. ................ 375/340 |
| 2010/0142429 A1* | 6/2010 | Yi et al. ........................ 370/312 |
| 2010/0322350 A1* | 12/2010 | Malladi ......................... 375/299 |
| 2012/0127909 A1* | 5/2012 | Lee et al. ...................... 370/312 |

FOREIGN PATENT DOCUMENTS

| | | |
|---|---|---|
| JP | 2007519304 A | 7/2007 |
| WO | 2006034819 A1 | 4/2006 |
| WO | 2008/050220 A1 | 5/2008 |

OTHER PUBLICATIONS

Wiegand, T. et al. "Overview of the H.264/AVC Video Coding Standard." IEEE Transactions on Circuits and Systems for Video Technology, vol. 13, No. 7, Jul. 2003, pp. 560-576.

Schierl, T. et al., "Mobile Video Transmission Using Scalable Video Coding," IEEE Transactions on Circuits and Systems for Video Technology, Sep. 2007, pp. 1204-1217, vol. 17, No. 9.

Liebl, G., et al., "Advanced Wireless Multiuser Video Streaming Using the Scalable Video coding Extensions of H.264/MPEG4-AVC", 2006 IEEE International Conference on Multimedia and Expo, Jul. 1, 2006, pp. 625-628, IEEE.

\* cited by examiner

METHOD OF TRANSMITTING MBMS DATA IN AN E-UTRAN-SYSTEM

TECHNICAL FIELD

The present invention relates to a method and a system for transmitting Multimedia Broadcast Multicast Service (MBMS) data in an Evolved Universal Terrestrial Radio Access Network (E-UTRAN) system.

BACKGROUND

Multimedia broadcast/multicast services over wireless networks, such as cellular radio networks are becoming widely spread, especially after that mobile handheld devices have become capable of receiving multimedia content via radio networks. However, delivering multimedia over a wireless channel to handheld devices has proven to pose a number of problems. For example, subscribers may experience different channel quality while receiving the same content. In addition, each user wants the highest possible quality of the media.

Layered and scalable codecs have been developed that enable adaptation of the broadcast/multicast stream to changing network conditions. A layered media consists of a base layer and a number of enhancement layers each providing quality refinement for the lower layers. The base layer usually carries the minimum information required by the decoder to provide a minimum quality for the receivers. Each additional layer may refine this minimum perceived quality by, e.g., raising the played out frames per second or extending the screen resolution.

Furthermore, smart bandwidth adaptation can be achieved by forwarding only the layers that are transmittable by altered network conditions. Also, layered media allows the network to handle a number of heterogeneous receivers in the same session having, e.g., different display sizes.

In spite of the existence of these codecs, the adaptation of multimedia flows has to be supported by delivery technologies and access networks as well.

Now, the necessary functions to support Multimedia Broadcast Multicast Service (MBMS) transmission in E-UTRAN also sometimes referred to as Long Term Evolution (LTE) networks are being discussed and defined in the 3GPP standardization body. An important difference compared to the MBMS service delivery in UTRAN comes from the distributed nature of the E-UTRAN architecture. In E-UTRAN the radio resource management functions, including the scheduling are located in the evolved Node Bs (eNodeBs), i.e. in the base stations as opposed to UTRAN, where the radio resource control is located centrally in the Radio Network Controller (RNC). Therefore, for MBMS transmission, which may require coordinated and time synchronized transmission from multiple cells (also called Single Frequency Network, i.e., Single Frequency Network (SFN) or Multi Broadcast Single Frequency Network (MB-SFN), transmission); additional central control entities have been added to the architecture. A currently proposed MBMS architecture is depicted in FIG. 1.

Figure 1:
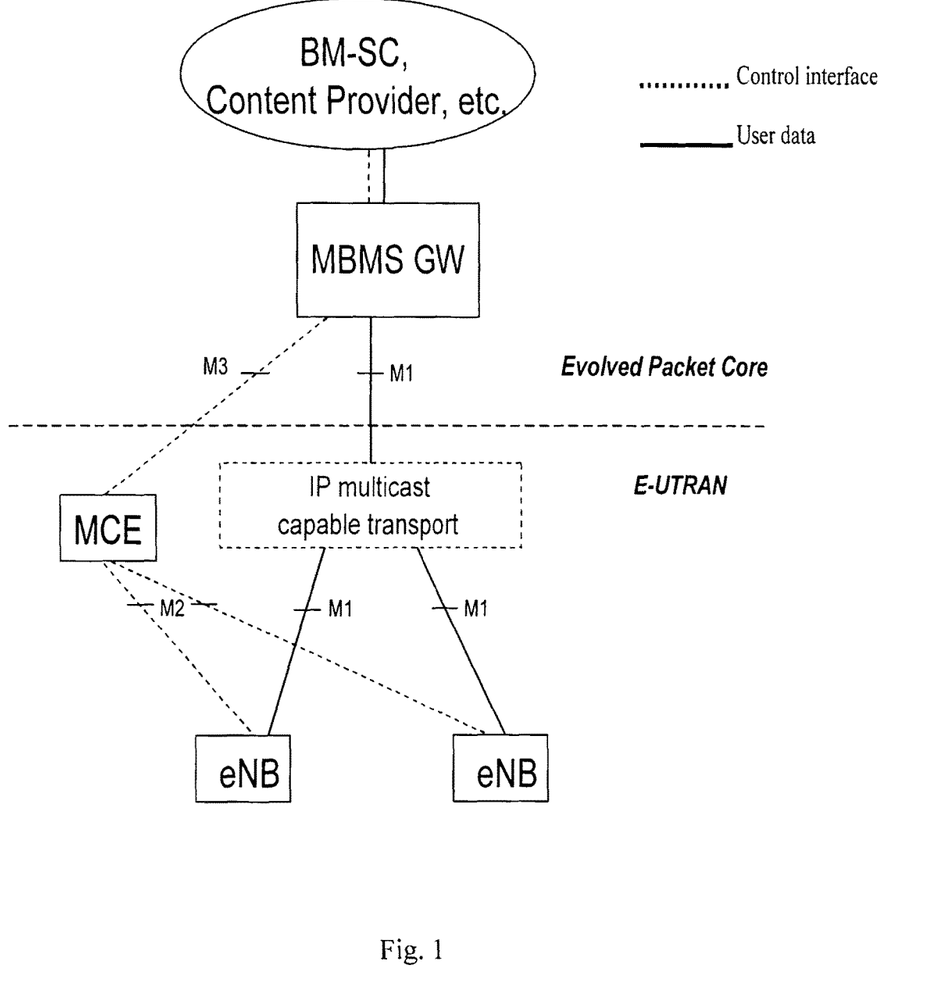
FIG. 1 is a general view of an E-UTRAN system.

In FIG. 1 BM-SC is the Broadcast Multicast Service Center, which is the application level server providing the multimedia content. The MBMS Gate Way (GW) is responsible for the user plane processing of the MBMS data, including such functions as content synchronization and delivering the data over a multicast IP transport to the relevant eNodeBs. The MBMS GW also executes control over the start and stop of the services and acts as a mediator between the access agnostic multimedia content sources and the LTE specific access network.

The MBMS Control Entity (MCE) is a radio resource control entity, which is responsible mainly for the coordinated allocation of radio resources over multiple cells in case of SFN transmission mode.

Currently the standard defines three main transmission methods to deliver MBMS content in LTE networks. These are:

Single Frequency Network (SFN) Transmission:

In this transmission mode, the same multimedia content is transmitted in multiple cells in a time synchronized fashion such that the physical signals arriving from different cells at the User Equipment (UE) can be soft-combined.

Single Cell PTM (Point to Multipoint) Transmission Without Feedback:

In this mode the transmission in a cell is targeted only for the users in the given cell. In other words, there is no coordination of the transmission from multiple cells. This also means that a particular eNodeB on its own can control the radio resources the eNodeB spend on the MBMS transmission, i.e. it is able to perform scheduling. No feedback information is available from the UEs regarding the link quality, success/failure of the reception.

Single Cell PTM Transmission with Feedback:

This mode is the same as Single Cell PTM transmission with the possibility of sending feedback information from the UEs regarding the link quality and/or the success/failure of the reception. Utilizing feedback information from the UEs can help to optimize the transmission accordingly and thereby utilize the radio resources more efficiently.

For the transport of MBMS data over the radio interface the standard currently defines the MCH transport channel, capable of SFN transmission and the MBMS Control Channel (MCCH) and the MBMS Traffic Channel (MTCH) logical channels. The MCCH and MTCH logical channels are mapped onto the MCH transport channel. Optionally, it may be possible to map these logical channels to the normal downlink shared channel (DL-SCH) used to deliver the unicast traffic as well. This may be possible in the single cell transmission cases, when the SFN transmission mode is not used and therefore the MCH transport channel can be omitted. The MTCH channel carries the actual MBMS data. The MCCH channel carries control information necessary for the reception of the MTCH channel. The MCCH includes session/service identities for sessions to be started, i.e., announcing service starts, identities for ongoing services, scheduling information etc.

Today, there exist a need for a method and a system that is able to improve the performance of an E-UTRAN radio system.

SUMMARY

It is an object of the present invention to improve existing E-UTRAN systems.

It is another object of the present invention to provide a method, system and a device that provides an extension to existing E-UTRAN transmission modes by which the E-UTRAN system is enabled to provide efficient transmission of layered media streams.

These objects and others are obtained by an E-UTRAN system transmitting layered MBMS data, the system further having signaling means for transmitting control information comprising information enabling a User Equipment (UE) to reconstruct the layered MBMS data.

Hence, in order to obtain a layered/scalable multimedia that can be multicast in an E-UTRAN MBMS, a signaling unit is provided for example in the eNodeB, which is adapted to provide control information to a user whereby the user is enabled to reconstruct a media stream transmitted in different layers. For example, the control information may contain, the session start and signaling that binds together the transmission of the different layers belonging to the same MBMS service, possibly sent with different transmission methods, i.e., in the hybrid case. Thus, by signaling to a UE where it can find the transmission of the different layers belonging to the same service a layered/scalable multimedia can be transmitted to a UE.

In one embodiment the system is provided with an entity for indicating to which layer transmitted data belongs to. The entity may for example be located in the eNodeB. Such an indication can be sent either on the MBMS point-to-multipoint Control Channel (MCCH) e.g., as part of the scheduling information or could be indicated via L1/L2 control signaling in case the regular DL-SCH is used for MBMS transmission. In case of L1/L2 control signaling the layer information can be signaled as different group Radio Network Temporary Identities (RNTIs) per layer when addressing the recipient of the transmission on the DL-SCH. Yet another alternative could be to signal the layer information in the Media Access Control (MAC) header.

In another embodiment feedback information from the UEs on the channel quality is transmitted from the UE to the eNodeB. With such feedback information more optimized layered media delivery can be achieved both from the user-perceived quality and also from the radio resource utilization point of view.

Also, in case feedback information received from the UEs is used, reference signal power measurement reports (similar to the ones used for handover) can advantageously be sent from the UEs to the eNodeB to be used as information to decide which layer and/or with which Transport Format to send.

Hence, by adding support to the signaling channels, protocols, etc., (e.g. information elements on the MCCH channel, signaling means) for each of the different MBMS transmission modes defined for E-UTRAN, which are required for the differentiated handling of the different media layers during the transmission, it is possible to take into account the radio channel conditions of the receiving UEs when deciding which components of the media stream to transmit and what transmission parameters to use such as transmission power, coding, etc.

For example, if the media layers are transmitted in single cell PTM transmission mode either with or without feedback such as a channel quality report, the eNodeB is enabled to decide which media layers are to be sent and what transport format and transmission power to apply for each distributed layer. Since the eNodeB can make the decision, the MCE does not need to be involved. This can be considered as a de-centralized solution. The optimization can further be enhanced if the UEs report their actual experienced radio quality. This feedback information can give more precise information to the eNodeB on how to distribute the media layers.

In another example, the existing MBSFN solution and the single cell PTM transmission mode are combined. In that case it can be advantageous to transmit more important layers, e.g. the base layer, in MBSFN mode and all the other layers are in single cell PTM mode.

In other words, the eNodeB can be set to determine the set of enhancement layers it wants to broadcast in the own cell based on information such as the number of UEs interested in the service, UE channel quality reports, available cell resources. etc., while a minimum quality is provided by the MBSFN transmission.

The invention also extends to a method for transmitting layered data in an E-UTRAN system and also to a User Equipment adapted to be used in the system. In addition the invention extends to a base station configured to transmit layered data in the E-UTRAN according to the above.

Using the method and system as described herein enables the optimization of the media stream quality and the used radio resources in an E-UTRAN broadcast system. The quality of the broadcast media can be adjusted to the actual radio channel quality of the end-users and to the available resources in the cell. The proposed a method and system further enables the E-UTRAN MBMS system to save resources for layered media multicast and better utilize the radio interface.

BRIEF DESCRIPTION OF THE DRAWINGS

The present invention will now be described in more detail by way of non-limiting examples and with reference to the accompanying drawings, in which.

DETAILED DESCRIPTION

If layered multimedia is used for SFN transmission, the system needs to define different MBSFN areas for each layer of the multimedia stream. The MBSFN area where the higher layers of the media stream are broadcast is a subset of the MBSFN area where the lower layers are broadcast. This would allow, for instance, a use case where higher layers of a media stream is broadcast only in certain parts of the network, e.g., in hot spots thereby, enabling a high quality media reception, while in the rest of the network, e.g., in the macro cells only the base layer of the media stream is broadcast. See also the international patent application No. PCT/EP2005/009387.

A further possibility to optimize the transmission when distributing layered media in MBSFN is to use different transport formats i.e., modulation and coding for the transmission of the different layers, see also PCT/EP2005/009387. Thereby, the amount of radio resources spent on the MBSFN transmission can be decreased in exchange for some compromise in the quality of the received media stream. That is, by sacrificing that the media stream will not be received with highest quality in the whole MBSFN area, some radio resources spent on MBSFN broadcast can be saved. This is a trade-off that can be utilized via the layered media concept.

However, the current specification of the MBMS services proposed for E-UTRAN does not allow for layered media when transmitting MBMS data. Although there exists the straight-forward solution of delivering layered media in MBMS by the MBSFN transmission mode concept, such methods do not enable the system to take into account UE feedbacks in optimizing the transmission of the different layers and do not consider single-cell transmission modes and their combination with MBSFN transmission when optimizing for layered media delivery.

By not considering the different needs of the different layers in the media stream, the E-UTRAN MBMS transmission methods will not be able to adapt the required radio resources to the different media stream layers and thereby they will fail to achieve better utilization of radio resources.

Figure 2:
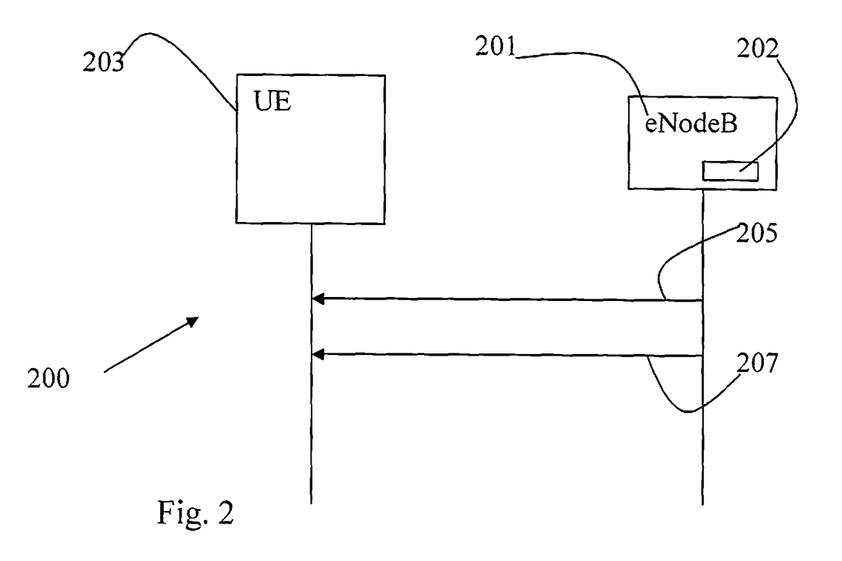
FIG. 2 is a view illustrating transmission of layered multimedia data in accordance with a first embodiment.
Figure 3:
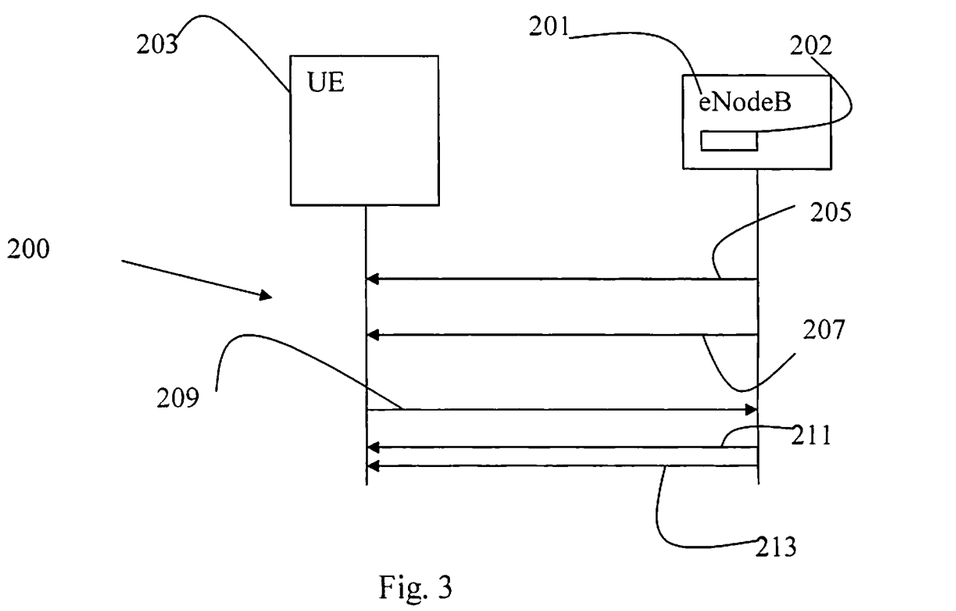
FIG. 3 is a view illustrating transmission of layered multimedia data in accordance with a second embodiment.
Figure 4:
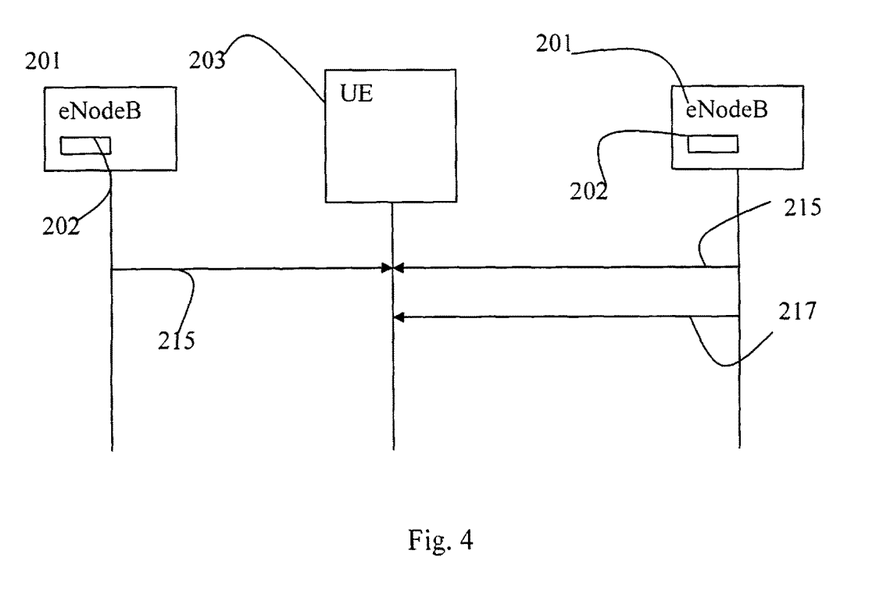
FIG. 4 is a view illustrating transmission of layered multimedia data in accordance with a third embodiment.

With reference to FIGS. 2, 3 and 4 and in accordance with the present invention support is added to the signaling channels, protocols, etc., for example, information elements on the MCCH channel, and signaling means 202 for each of the different MBMS transmission modes defined for an E-UTRAN system 200, which are required for the differentiated handling of the different media layers during the transmission. The addition of support for MBMS transmission in an E-UTRAN system makes it possible to take into account the radio channel conditions of receiving UEs 203 when deciding which components of the media stream to transmit and what transmission parameters to use such as transmission power, coding, etc. Below transmission for different transmission modes are described.

In the single cell PTM without feedback mode, the application of layered media allows the system to employ different transport formats and/or transmit powers for the broadcast of the different layers of the media stream. With reference to FIG. 2, the base layer or lower layers can be broadcast with high enough power in a data stream 205 from the eNodeB 201 to a UE 203 and with an appropriate transport format such that the transmission can be received with high probability even at the cell edge. Then the higher media layers can be broadcast with lower power in a data stream 207 in order to decrease the interference caused to neighbor cells and/or with a less protective transport format in order to save radio resources in the cell.

In the single cell PTM without feedback mode, the eNodeB 201 may also be enabled to suspend the transmission of higher media layers if it does not have enough resources or an unacceptably high interference is caused to neighbor cells. For the coordination of resources used for the PTM transmission in the neighbor cells (e.g., to control interference), either the MCE could coordinate which radio resources to be used for PTM transmission in neighbor cells or the neighbor eNodeBs could negotiate it among themselves.

In accordance with one embodiment an indication for each transport block is sent on the radio interface to which layer it belongs to. Hereby the UE can decode the transport block according to the appropriate transport format. For this purpose it is possible to indicate the layer information either as part of the scheduling information sent on MCCH. Alternatively, in accordance with another embodiment, when the MCCH/MTCH logical channels are mapped onto the DL-SCH, the layer information can be indicated via the L1/L2 control signaling used to address the scheduled UE in the DL-SCH. This can for example be performed by using a separate group RNTI (Radio Network Temporary Identity) for each layer when addressing the recipient of the data sent on DL-SCH.

In the single cell PTM with feedback transmission mode, a similar solution can be applied as for the no-feedback case. However in addition, the UE 203 can be configured to transmit feedback information relating to the channel conditions in a message 209. The eNodeB 201 can use also feedback information from the UEs when selecting transmission parameters, such as transport format and transmit power, to be used for the transmission of the different layers in subsequent data transmissions 211 and 213. The selection may include the decision on whether to transmit a certain layer at all. Similarly as in the single cell PTM without feedback mode, the transmission of a given layer can be dependent also on the interference conditions caused to neighbor cells.

The UEs can send feedback information on the measured reference signal power that can be used by the eNodeB to estimate the path loss toward the UEs and set the transmission power and/or transport format accordingly. Other feedback information such as Channel Quality Indicator (CQI) feedback may also be used for this purpose. In addition, information about the UE capabilities such as the screen size, etc. may also be used by the eNodeB to decide which layers to broadcast.

The channel quality information received from the UE can be based on regular handover measurement reports, such as a measured reference signal power. The channel quality information received from the UE can also be based on a Channel Quality Indicator (CQI) reporting similar or even the same as used for channel reporting in case of unicast traffic. The UE may have unicast traffic ongoing in parallel with the MBMS reception, and then the unicast channel reporting may be used for MBMS purposes as well.

Also, the channel quality information may be coupled to the counting mechanism, which used to identify how many UEs are interested in a given service. In that case the channel quality information can be transmitted together with the counting information.

In the Hybrid transmission with MBSFN and Single Cell PTM mode, which can be regarded as a combination of MBSFN transmission and single cell PTM transmission, the base layer or the lower layers of the media stream can be sent in MBSFN mode in the given MBSFN area in transmissions 215. As a result all users will be able to receive the media stream with some base quality in the entire MBSFN area. Then, in addition each eNodeB may or may not be configured to broadcast the higher layer media components in single cell PTM mode in a transmission 217. This can be performed with or without feedback from a UE 203. This allows for each eNodeB 201 to decide autonomously based on its available radio resources and potentially using feedback information from UEs whether it wants to broadcast the higher layers or not.

In accordance with one embodiment a base station, i.e. the eNodeB, can take into account the own traffic load both unicast and existing multicast when deciding to transmit higher layers. Also UE feedback information both channel feedback and counting information and possibly also the interference caused to neighbor cells can be taken into account when a base station decides which layers to transmit in PTM or MBSFN mode or whether to transmit anything in PTM mode at all.

The time-frequency resource in which the higher layers are broadcast in single cell PTM mode can for example be selected by a scheduler in the eNodeB. If these resources are selected autonomously by the eNodeBs, the PTM transmission of neighbor eNodeBs may cause interference to each other. In order to avoid a high interference level, the eNodeBs may regulate the maximum power spent on PTM broadcast and may also adjust the transmitted power level based on feedback information from the UEs. In accordance with one embodiment the MCE can be configured to act as a coordinator to avoid such interference.

For example, the UEs may send measurement reports on received reference signal power, for example the same used for handover measurements, which can be used by the eNodeB to obtain the path loss toward the UEs and adjust the downlink transmit power accordingly. This feedback, i.e., the measurement report can be sent either via the signaling bearer, e.g. via regular RRC protocol signaling or combined with the counting information as part of the MBMS counting procedure.

When sending the higher layer media components with the single cell PTM transmission mode the eNodeB is preferably configured to take care of the timing of the transmission in relation to the MBSFN transmission such that when the data belonging to the higher media layers are received in the UE it is not yet outdated and can be presented to the user at the UE combined with the base layer data received via the MBSFN transmission. The UE can reorder packets in the playout buffer, if necessary. However, this requires the E-UTRAN network to keep the delay below the delay tolerance of the playout buffer of the UE.

Upon the start of the service it has to be signaled to the UEs where a UE can find the transmission of the different media layers belonging to the same service, i.e. whether a given layer is transmitted in the MBSFN mode or in the single cell broadcast mode. The signaling can provide the coupling between the layers sent with the different transmission modes, i.e., creating the coupling between the IDs used in the different transmission modes for the identification of the different streams (connections). This signaling may need to be repeated periodically or sent dedicated to each UE newly entering the cell.

Figure 5:
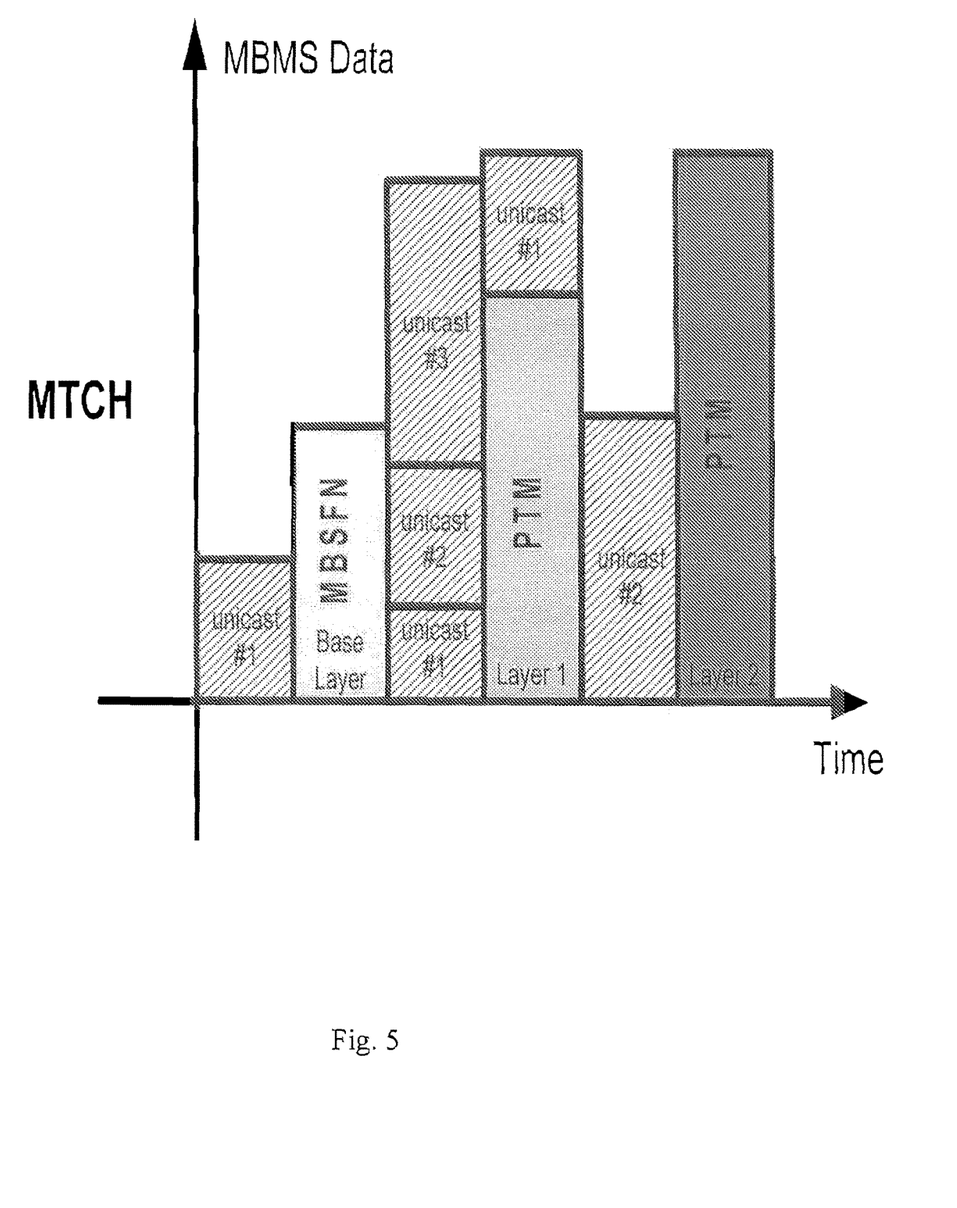
FIG. 5 is a view illustrating timing of transmission of layered data.

FIG. 5 shows the timeline of the radio interface transmission of the MBSFN and the PTM transport blocks in the hybrid transmission scenario. It can be seen, that since the minimum quality of the media is to be provided for all UEs (at least) the base layer has to be sent in MBSFN mode in order to reach even the cell edge UEs. Furthermore in each cell the eNodeBs can optimize the distribution of higher layers by PTM transmission mode. In FIG. 2 the PTM mode is used for the two enhancement layers above the base (Enh#1 and Enh#2).

Figure 6:
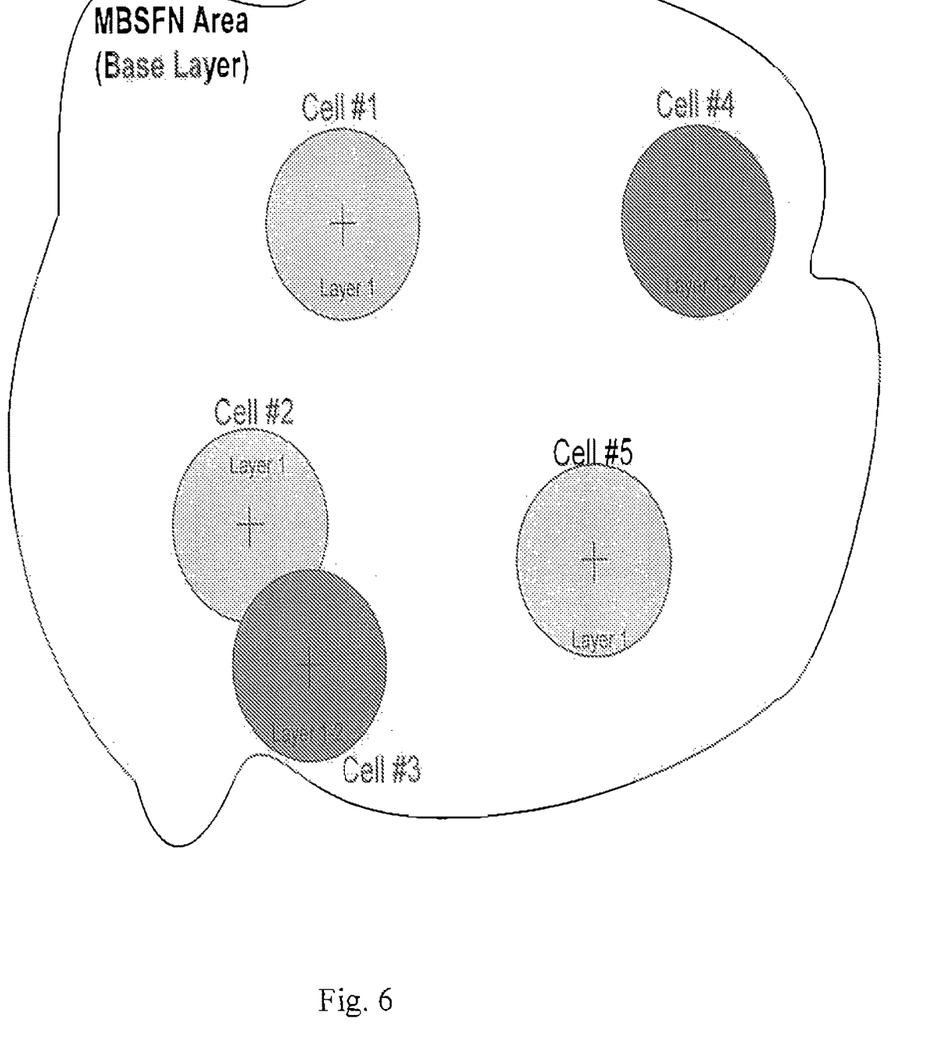
FIG. 6 is a view of an E-UTRAN system configured for transmitting layered multimedia data.

FIG. 6 shows the network view of the MBSFN transmissions plus the PTM transmissions in individual cells. The base layer is distributed by MBSFN within the whole area, while individual cells can optimize the transmission of higher layers locally.

For the optimized distribution of the media layers the Evolved Packet Core network preferably provides the eNodeB information on which layer a particular IP packet belongs to. That is, the IP packets should carry the corresponding layer ID. This can be provided by either GTP tunnels or by sending each media layer to different IP multicast group addresses If GTP tunnels are used, a tunnel between the MBMS GW and the eNodeBs should be established for each transmitted layer. The eNodeBs should be indicated which tunnel corresponds to which layer.

If IP multicast addresses are used to differentiate the layers the valid range of IP multicast addresses corresponding to the given service should be indicated to the eNodeBs. In case the MBMS GW is attached directly to the IP-MB, this layer ID indication method is rather simple since the multicast routing protocols (e.g., PIM-SM) usually forward the layers on the IP-MB as individual streams each addressed to different multicast groups. If the MBMS GW does not receive the media stream in such a way, GTP tunneling can be used.

The transmission on the transport network can be either unicast or IP multicast. However, the applied method strongly depends on which transmission mode is used in the access part. In MBSFN transmission mode IP multicast can be used. This enables the operator to save resources on the transport compared to simple unicast transmission. If PTM mode is used either unicast or multicast transmission can be applied. In Hybrid mode the base layer(s) can be multicast (because of the MBSFN) while higher layers can be chosen to be unicast or multicast.

The invention claimed is:

1. An Evolved Universal Terrestrial Radio Access Network (E-UTRAN) system transmitting Multimedia Broadcast Multicast Service (MBMS) data, the system comprising:
    a base station for transmitting the MBMS data as layered data comprising a lower layer in a first transmit stream and a number of higher enhancements layers in a second transmit stream different from the first transmit stream; and
    signaling circuitry for transmitting control information comprising signaling that binds together the different layers transmitted in the first and second transmit streams and belonging to the same MBMS service enabling a User Equipment (UE) to reconstruct the layered MBMS data; and
    an entity configured to indicate to which layer data transmitted belongs.

2. The system according to claim 1, wherein the entity for indicating to which layer data transmitted belongs is configured to transmit the indication on the MBMS point-to-multipoint Control Channel (MCCH).

3. The system according to claim 1, wherein the entity for indicating to which layer data transmitted belongs is configured to transmit the indication via L1/L2 control signaling.

4. The system according to claim 1, wherein the entity for indicating to which layer data transmitted belongs is configured to transmit the indication in a Media Access Control (MAC) header.

5. The system according to claim 1, wherein the UE is configured to transmit feedback information relating to the channel quality.

6. The system according to claim 5, wherein the system is adapted to select transport format based on information relating to the channel quality received from the UE.

7. The system according to claim 6, wherein the system is adapted to use regular handover measurement reports as input information when selecting transport format.

8. The system according to claim 1, wherein the system is configured to employ different transport formats or transmit powers, for transmitting the different layers of the MBMS data.

9. The system according to claim 8, wherein the system is adapted to transmit the higher media layers in the second transmit stream with lower power than lower media layers in the first transmit stream.

10. The system according to claim 1, wherein, when the system is configured in a Multi Broadcast Single Frequency Network (MBSFN), transmission mode, the system is configured to transmit a base layer or lower layers of the MBMS data in MBSFN mode in a given MBSFN area.

11. The system according to claim 10, wherein the system is configured to transmit higher layer media components in single cell Point to Multipoint (PTM) mode with or without feedback.

12. The system according to claim 11, wherein the system is configured to transmit higher layer media components in single cell Point to Multipoint (PTM) mode based on any one or more of the traffic load in a given base station, UE feedback information, or the interference caused to neighbor cells.

13. The system according to claim 11, wherein the system is configured coordinate the PTM allocations in neighbor cells in order to avoid excessive interference either via base station to base station negotiation or via coordination from a central MBMS Control entity (MCE).

14. A method of transmitting Multimedia Broadcast Multicast Service (MBMS) data Evolved Universal Terrestrial Radio Access Network (E-UTRAN) system, said method comprising:
    transmitting the data as layered data comprising a lower layer in a first transmit stream and a number of higher enhancements layers in a second transmit stream different than the first transmit stream;
    signaling control information, comprising signaling that binds together the transmission of the different layers in the first and second transmit streams belonging to the same MBMS service, from the system enabling a User Equipment (UE) to reconstruct the layered MBMS data; and
    transmitting data indicating to which layer layered data belongs.

15. The method according to claim 14, further comprising transmitting the data indicating to which layer layered data belongs on the MBMS point-to-multipoint Control Channel (MCCH).

16. The method according to claim 14, further comprising transmitting the data indicating to which layer layered data belongs is transmitted via L1/L2 control signaling.

17. The method according to claim 14, further comprising transmitting the data indicating to which layer layered data belongs in a Media Access Control (MAC) header.

18. The method according to claim 14, further comprising receiving feedback information relating to the channel quality from the UE.

19. The method according to claim 18, further comprising selecting a transport format based on the feedback information from the UE.

20. The method according to claim 19, further comprising using regular handover measurement reports as input information when selecting transport format.

21. The method according to claim 14, wherein different transport formats or transmit powers are used for transmission of different layers of the MBMS data.

22. The method according to claim 21, wherein higher media layers in the second transmit stream are transmitted with lower power than lower media layers in the first transmit stream.

23. The method according to claim 14, wherein, when the system is configured in a Multi Broadcast Single Frequency Network (MBSFN), transmitting a base layer or lower layers of the MBMS data in MBSFN mode in a given MBSFN area.

24. The method according to claim 23, wherein higher layer media components are transmitted in single cell Point to Multipoint (PTM) mode with or without feedback.

25. The method according to claim 24, wherein higher layer media components are transmitted in single cell Point to Multipoint (PTM) mode based on at least one of a current traffic load for a base station, UE feedback information, or the interference caused to neighbor cells.

26. The method according to claim 24, wherein the PTM allocations in neighbor cells is coordinated via base station to base station negotiation or via coordination from a central MBMS Control entity (MCE) in order to avoid excessive interference.

27. A base station for use in an Evolved Universal Terrestrial Radio Access Network (E-UTRAN) system transmitting Multimedia Broadcast Multicast Service (MBMS) data, said base station comprising:
    a transmitter for transmitting the MBMS data as layered data comprising a lower layer and a number of higher enhancements layers, wherein the lower layer is transmitted in a first transmit stream, and wherein the number of higher enhancements layers are transmitted in a second transmit stream different from the first transmit stream;
    signaling circuitry associated with the transmitter, for transmitting control information comprising signaling that binds together the transmission of the different layers in the first and second transmit streams and belonging to the same MBMS service enabling a User Equipment to reconstruct the layered MBMS data; and
    an entity configured to indicate to which layer data transmitted belongs.

28. The base station according to claim 27, wherein the entity for indicating to which layer layered data belongs is configured to transmit the indication on the MBMS point-to-multipoint Control Channel (MCCH).

29. The base station according to claim 27, wherein the entity for indicating to which layer layered data belongs is configured to transmit the indication via L1/L2 control signaling.

30. The base station according to claim 27, wherein the entity for indicating to which layer layered data belongs is configured to transmit the indication in a Media Access Control (MAC) header.

31. The base station according to claim 27, wherein the base station is configured to receive feedback information relating to the channel quality from a UE in the E-UTRAN system.

32. The base station according to claim 31, wherein the base station is adapted to select a transport format based on information relating to the channel quality received from the UE.

33. The base station according to claim 32, wherein the base station is adapted to use regular handover measurement reports as input information when selecting transport format.

34. The base station according to claim 27, wherein the base station is configured to employ different transport formats or transmit powers, for transmitting the different layers of the MBMS data.

35. The base station according to claim 34, wherein the base station is adapted to transmit the higher media layers in the second transmit stream with lower power than lower media layers in the first transmit stream.

36. The base station according to claim 27, wherein, when the system is configured in a Multi Broadcast Single Frequency Network (MBSFN) transmission mode, the base station is configured to transmit a base layer or lower layers of the MBMS data in MBSFN mode in a given MBSFN area.

37. The base station according to claim 36, wherein the base station is configured to transmit higher layer media components in single cell Point to Multipoint (PTM) mode with or without feedback.

38. The base station according to claim 37, wherein the base station is configured to transmit higher layer media components in single cell Point to Multipoint (PTM) mode based on one or more of the traffic load in a given base station, UE feedback information, or the interference caused to neighbor cells.

39. The base station according to claim 37, wherein the base station is configured coordinate the PTM allocations in neighbor cells in order to avoid excessive interference either via base station to base station negotiation or via coordination from a central MBMS Control (MCE) entity.

40. A User Equipment (UE) for use in an Evolved Universal Terrestrial Radio Access Network (E-UTRAN) system transmitting Multimedia Broadcast Multicast Service (MBMS) data, said UE comprising:
  a receiver for receiving the MBMS data as layered data in first and second different transmit streams, wherein the first transmit stream comprises a lower layer of the MBMS data and wherein the second transmit stream comprises a number of higher enhancements layers of the MBMS data;
  processing circuitry for receiving control information via said receiver, said control information comprising signaling that binds together the transmission of the different layers in the first and second transmit streams belonging to the same MBMS service, thereby enabling the UE to reconstruct the layered MBMS data; and
  wherein the UE is configured to receive an indication on a MBMS point-to-multipoint Control Channel (MCCH), indicating to which layer layered data belongs.

41. The UE according to claim 40, wherein the UE is configured to receive an indication via L1/L2 control signaling, indicating to which layer layered data belongs.

42. The UE according to claim 40, wherein the UE is configured to receive an indication in a Media Access Control (MAC) header, indicating to which layer layered data belongs.

43. The UE according of claim 40, wherein the UE includes a transmitter and is configured to transmit, via said transmitter, feedback information relating to the channel quality.

44. The UE according to claim 40, wherein, when the system is configured in a Multi Broadcast Single Frequency Network (MBSFN), transmission mode, the UE is configured to receive a base layer or lower layers of the MBMS data in MBSFN mode in a given MBSFN area.

45. The UE according to claim 44, wherein the UE is configured to receive higher layer media components in single cell Point to Multipoint (PTM) mode with or without feedback.

* * * * *